US012149694B2

(12) United States Patent
Iwamura et al.

(10) Patent No.: US 12,149,694 B2
(45) Date of Patent: Nov. 19, 2024

(54) ENCODING DEVICE, DECODING DEVICE AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 139 days.

(21) Appl. No.: 17/655,314

(22) Filed: Mar. 17, 2022

(65) Prior Publication Data

US 2022/0210420 A1    Jun. 30, 2022

Related U.S. Application Data

(63) Continuation of application No. PCT/JP2020/035156, filed on Sep. 16, 2020.

(30) Foreign Application Priority Data

Sep. 20, 2019  (JP) ................................. 2019-172329

(51) Int. Cl.
*H04N 19/00*    (2014.01)
*H04N 19/126*   (2014.01)
(Continued)

(52) U.S. Cl.
CPC ......... *H04N 19/126* (2014.11); *H04N 19/159* (2014.11); *H04N 19/176* (2014.11)

(58) Field of Classification Search
CPC .. H04N 19/126; H04N 19/159; H04N 19/176; H04N 19/157; H04N 19/186
See application file for complete search history.

(56) References Cited

U.S. PATENT DOCUMENTS 5,487,086 A  *  1/1996  Bhaskar ............... G10L 19/0212
                                                   375/243
7,460,041 B2 * 12/2008  Yang ................... H03M 7/4006
                                                   341/51
(Continued)

OTHER PUBLICATIONS

International Search Report issued in PCT/JP2020/035156; mailed Dec. 8, 2020.
(Continued)

*Primary Examiner* — Frank F Huang
(74) *Attorney, Agent, or Firm* — Studebaker & Brackett PC

(57) ABSTRACT

The encoding device includes: a predictor configured to generate, for each component, a prediction block corresponding to an encoding-target block; a residual generator configured to generate, for each component, a prediction residual representing a difference between the encoding-target block and the prediction block; a mode selector configured to select one mode either an individual encoding mode performing a transform process and a quantization process on a prediction residual of the first component and a prediction residual of the second component for each single component, or a joint encoding mode performing a transform process and a quantization process on a joint prediction residual generated from the prediction residual of the first component and the prediction residual of the second component; a quantization controller configured to determine a quantization matrix to be applied in the quantization process based on the mode selected by the mode selector.

15 Claims, 5 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 8,135,062 | B1* | 3/2012 | Cote | H04N 19/198 375/240.03 |
| 9,826,241 | B2* | 11/2017 | Shima | H04N 19/129 |
| 2007/0030180 | A1* | 2/2007 | Yang | H04N 19/44 341/50 |
| 2009/0067493 | A1* | 3/2009 | Jun | H04N 19/176 375/E7.076 |
| 2011/0279644 | A1* | 11/2011 | Suh | H04N 21/23614 348/E13.001 |
| 2012/0257674 | A1* | 10/2012 | Macq | H04N 19/109 375/E7.243 |
| 2013/0003828 | A1* | 1/2013 | Cohen | H04N 19/61 375/240.12 |
| 2014/0016698 | A1* | 1/2014 | Joshi | H04N 19/14 375/240.12 |
| 2014/0226721 | A1* | 8/2014 | Joshi | H04N 19/176 375/240.12 |
| 2014/0376633 | A1* | 12/2014 | Zhang | H04N 19/597 375/240.16 |
| 2016/0219283 | A1* | 7/2016 | Chen | H04N 19/105 |
| 2023/0040392 | A1* | 2/2023 | Aoki | H04N 21/235 |

OTHER PUBLICATIONS

Jianle Chen et al. "Algorithm description for Versatile Video Coding and Test Model 6 (VTM 6)" Joint Video Experts Team of ITU-T SG 16 WP 3 and ISO/IEC JTC 1/SC 29/WG 11, 15th Meeting, JVET-O2002-v2, Jul. 3-12, 2019, pp. 1-87, Gothenburg, Sweden.

Benjamin Bross et al. "Versatile Video Coding (Draft 6)" Joint Video Experts Team of ITU-T SG 16 WP 3 and ISO/IEC JTC 1/SC 29/WG 11, 15th Meeting, JVET-O2001-vE, Jul. 3-12, 2019, pp. 1-10, Gothenburg, Sweden.

Jani Lainema "CE7: Joint Coding of Chrominance Residuals (CE7-1)" Joint Video Experts Team of ITU-T SG 16 WP 3 and ISO/IEC JTC 1/SC 29/WG 11, 14th Meeting, JVET-N0054, Mar. 19-27, 2019, pp. 1-6, Geneva, Switzerland.

* cited by examiner

FIG. 2

|  | LOW FREQUENCY | | | HIGH FREQUENCY |
|---|---|---|---|---|
| LOW FREQUENCY | 6 | 13 | 20 | 20 |
|  | 13 | 20 | 28 | 28 |
|  | 28 | 28 | 32 | 37 |
| HIGH FREQUENCY | 32 | 32 | 37 | 42 |

ENCODING DEVICE, DECODING DEVICE AND PROGRAM

RELATED APPLICATIONS

The present application is a continuation based on PCT Application No. PCT/JP2020/035156, filed on Sep. 16, 2020, which claims the benefit of Japanese Patent Application No. 2019-172329 filed on Sep. 20, 2019. The content of which is incorporated by reference herein in their entirety.

TECHNICAL FIELD

The present invention relates to an encoding device, a decoding device and a program.

BACKGROUND ART

In a video encoding scheme typified by HEVC and VVC, an encoding device outputs a bit stream by performing a transform process, a quantization process and an entropy encoding process on a prediction residual that is a difference between a predicted image generated through inter prediction or intra prediction and an original image.

In the quantization process, quantization is performed using a coefficient set for each pixel within a block called a quantization matrix in addition to a quantization parameter (QP) set for each encoding-target block. The quantization matrix is introduced for the purpose of controlling quantization for each frequency component of transform coefficients to control quality in accordance with visual perception intensity. The quantization matrix may be called a scaling list.

As the quantization matrix, whether values (16) specified in advance as default values are applied or a table that is set by a user for each block size, for each color component and for each prediction mode is applied can be switched in units of sequences or in units of pictures.

By the way, in the VVC, joint coding of chroma residual (JCCR) is employed as a coefficient encoding mode of a chrominance component (see, for example, Non-Patent Literature 1).

In such a joint encoding mode, an encoding device generates one joint prediction residual from a prediction residual of a first chrominance component (Cb component) and a prediction residual of a second chrominance component (Cr component) by utilizing correlation between the first chrominance component and the second chrominance component. For example, the encoding device generates a joint prediction residual by combining a prediction residual obtained by inverting the polarity of the prediction residual of the second chrominance component with the prediction residual of the first chrominance component. Then, the encoding device performs a transform process, a quantization process and an entropy encoding process on the generated joint prediction residual and transmits the joint prediction residual.

A decoding device reconstructs the prediction residual of the first chrominance component and the prediction residual of the second chrominance component from the transmitted joint prediction residual. In this manner, by transmitting only one joint prediction residual for two chrominance components, encoding efficiency is improved.

In selection of a mode on the encoding device side, rate distortion cost is calculated from a prediction mode, an information amount necessary for transmitting the prediction residual and image quality for each of a case where the joint encoding mode is applied and a case where the joint encoding mode is not applied, and whether or not to apply the joint encoding mode is determined by comparing the calculated rate distortion cost.

In a case where the joint encoding mode is not applied, a prediction mode in which energy of the prediction residual converges in a low frequency component by a transform process to be applied to the prediction residual of each of the first chrominance component and the second chrominance component is more likely to be selected. As a result of this, energy distribution of transform coefficients of each of the first chrominance component and the second chrominance component tends to be more likely to be biased to the low frequency component.

On the other hand, in a case where the joint encoding mode is applied, a prediction mode in which the polarity of the prediction residual of the first chrominance component is inverted from the polarity of the second chrominance component tends to be more likely to be selected. As a result, energy distribution of the transform coefficients in a case where a transform process is applied to the joint prediction residual is highly likely to be different from energy distribution in a case where the joint encoding mode is not applied.

In the VVC or the HEVC, quantization cannot be sufficiently controlled only with the QP that is a single parameter for each block, and thus, to independently control a quantization process of a luminance component and each chrominance component, a given QP offset (pps_cb_qp_offset and pps_cr_qp_offset) can be set for each chrominance component in units of pictures.

Further, tendency of the transform coefficients of the joint prediction residual is different between a case where the joint encoding mode is applied and a case where the joint encoding mode is not applied as described above, in a draft of the VVC committee, a QP offset (pps_joint_cbcr_qp_offset) can be set for the joint prediction residual of a block to which the joint encoding mode is to be applied in units of pictures to independently control quantization between a case where the joint encoding mode is applied and a case where the joint encoding mode is not applied.

CITATION LIST

Patent Literature

Non Patent Literature 1: JVET-O2002, "Algorithm description for Versatile Video Coding and Test Model 6 (VTM 6)"

DISCLOSURE OF INVENTION

Technical Problem

However, while in the method in related art, the quantization matrix can be set for each component (Y, Cb, Cr), for each block size and for each prediction mode, the quantization matrix for the first chrominance component is used regardless of whether or not the joint encoding mode is applied.

In other words, in the method in related art, even in a case where the joint encoding mode is applied, the quantization matrix set for improving quality of a block to which the joint encoding mode is not applied is used.

Such use of the quantization matrix set for improving quality of a block to which the joint encoding mode is not applied for a block to which the joint encoding mode is applied may cause visual deterioration on the contrary.

The present invention is therefore directed to providing an encoding device, a decoding device and a program that improve image quality and encoding efficiency by enabling use of an appropriate quantization matrix even in a case where a joint encoding mode is applied.

An encoding device according to a first feature performs encoding on each of blocks generated by dividing an image composed of two or more components including a first component and a second component. The encoding device includes: a predictor configured to generate, for each component, a prediction block corresponding to an encoding-target block; a residual generator configured to generate, for each component, a prediction residual representing a difference between the encoding-target block and the prediction block; a mode selector configured to select one mode either an individual encoding mode performing, for each single component, a transform process and a quantization process on a prediction residual of the first component and a prediction residual of the second component, or a joint encoding mode performing a transform process and a quantization process on a joint prediction residual generated from the prediction residual of the first component and the prediction residual of the second component; a quantization controller configured to determine a quantization matrix to be used in the quantization process based on the mode selected by the mode selector; and a joint transformer/quantizer configured to perform the quantization process, using the quantization matrix determined by the quantization controller, on joint transform coefficients generated through the transform process of the joint prediction residual, in a case where the mode selector selects the joint encoding mode.

A decoding device according to a second feature performs decoding on each of blocks generated by dividing an image composed of two or more components including a first component and a second component. The decoding device includes: an entropy decoder configured to output a first flag and quantized transform coefficients by decoding an encoded stream, the first flag indicating whether or not a joint encoding mode is applied on an encoding device side, wherein the joint encoding mode performs a transform process and a quantization process on a joint prediction residual generated from a prediction residual of the first component and a prediction residual of the second component; an inverse quantization controller configured to determine a quantization matrix to be used in an inverse quantization process to be performed on the quantized transform coefficients based on the first flag; and a joint inverse quantizer configured to perform the inverse quantization process on the quantized transform coefficients outputted from the entropy decoder, using the quantization matrix determined by the inverse quantization controller, in a case where the first flag indicates that the joint encoding mode is applied.

A program according to a third feature causes a computer to function as the encoding device according to the first feature.

A program according to a fourth feature causes a computer to function as the decoding device according to the second feature.

According to the present invention, an encoding device, a decoding device and a program that improve image quality and encoding efficiency by enabling use of an appropriate quantization matrix even in a case where a joint encoding mode is applied.

BRIEF DESCRIPTION OF DRAWINGS

FIG. 2 is a diagram illustrating an example of a quantization matrix.

DESCRIPTION OF EMBODIMENTS

An encoding device and a decoding device according to an embodiment are described with reference to the accompanying drawings. The encoding device and the decoding device according to the embodiment encode and decode videos such as MPEG videos. In the description of the drawings below, the same or similar reference signs are used for the same or similar parts.

<Encoding Device>

Figure 1:
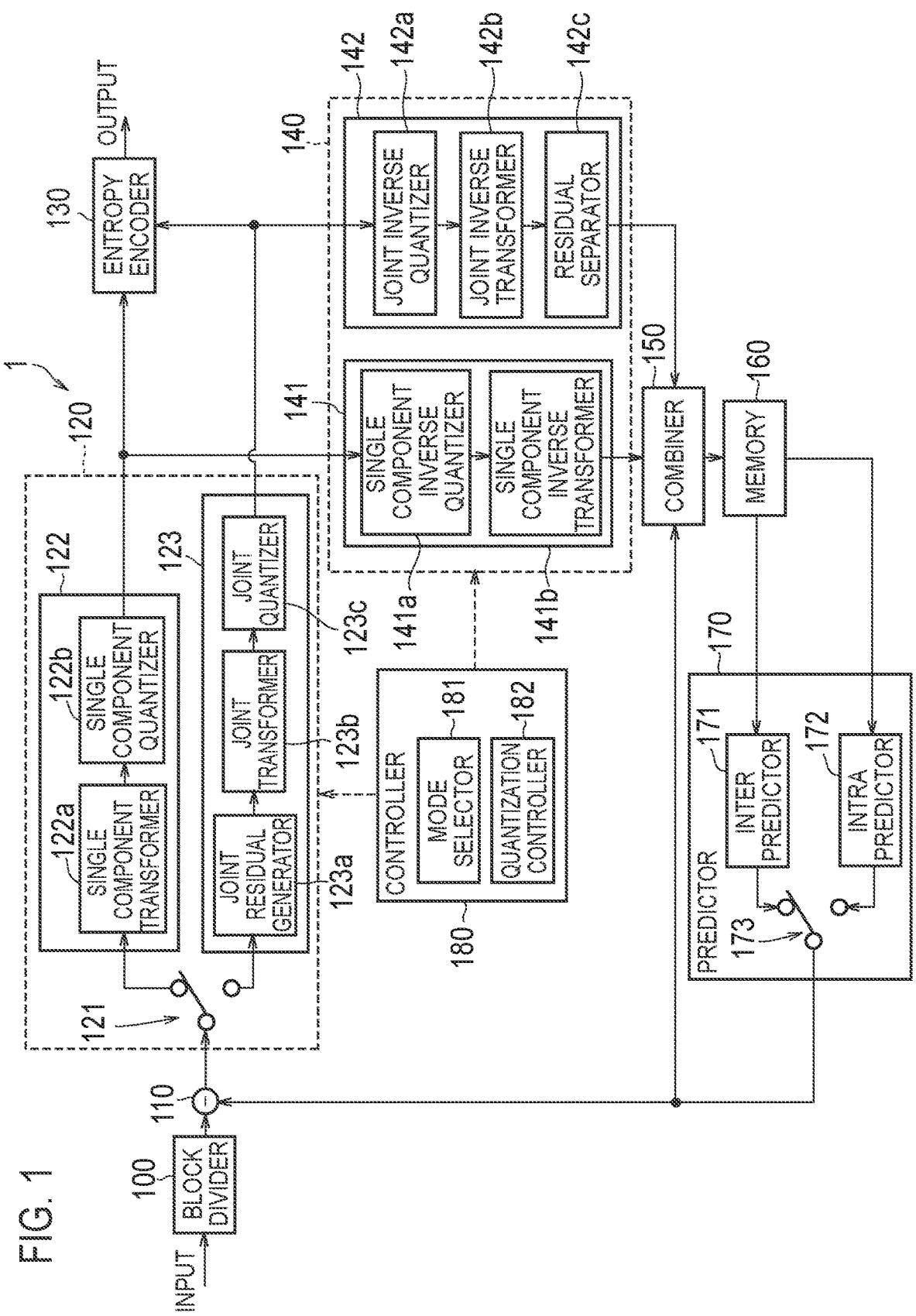
FIG. 1 is a diagram illustrating the configuration of an encoding device according to an embodiment.

First, a configuration of the encoding device according to the present embodiment is described. FIG. 1 is a diagram illustrating the configuration of the encoding device 1 according to the present embodiment. The encoding device 1 is a device that performs encoding on each of blocks generated by dividing an image included two or more components.

As illustrated in FIG. 1, an encoding device 1 includes a block divider 100, a residual generator 110, a transformer/quantizer 120, an entropy encoder 130, an inverse quantizer/inverse transformer 140, a combiner 150, a memory 160, a predictor 170 and a controller 180.

The block divider 100 divides an input image in units of frames (or pictures) that constitute a video into a plurality of image blocks and outputs the image blocks generated by division to the residual generator 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

The block divider 100 performs block division on an illuminance component (Y component) and a chrominance component. The chrominance component includes a first chrominance component (Cb component) and a second chrominance component (Cr component). Although a following description is given mainly of a case in which shapes made by the block division are identical for the luminance component and the chrominance component, the block division may be controllable independently for the luminance component and the chrominance component. A luminance block and a chrominance block are simply referred to as an encoding-target block when the blocks are not particularly distinguished from each other. Further, the first chrominance component and the second chrominance component are simply referred to as a chrominance component when the chrominance components are not particularly distinguished from each other.

The residual generator 110 calculates prediction residuals that represent differences (errors) between an encoding-target block outputted from the block divider 100 and a prediction block generated by the predictor 170 predicting the encoding-target block for each component and outputs the calculated prediction residuals to the transformer/quantizer 120. More specifically, the residual generator 110 outputs a prediction residual of the illuminance component, a prediction residual of the first chrominance component and a prediction residual of the second chrominance component to the transformer/quantizer 120 for one encoding-target block.

The transformer/quantizer 120 performs a transform process and a quantization process on the prediction residual of each component outputted from the residual generator 110 in units of blocks. The transformer/quantizer 120 includes a switcher 121, a single component transformer/quantizer 122 and a joint transformer/quantizer 123.

The switcher 121 outputs the prediction residual of each component outputted from the residual generator 110 to one of the single component transformer/quantizer 122 and the joint transformer/quantizer 123 under control of the controller 180. The switcher 121 outputs the prediction residual of the illuminance component to the single component transformer/quantizer 122.

The switcher 121 outputs to the single component transformer/quantizer 122, the prediction residual of the first chrominance component and the prediction residual of the second chrominance component for a block for which an individual encoding mode is selected, the individual encoding mode being a mode in which a transform process and a quantization process are performed on the prediction residual of the first chrominance component and the prediction residual of the second chrominance component for each single component.

On the other hand, the switcher 121 outputs to the joint transformer/quantizer 123, the prediction residual of the first chrominance component and the prediction residual of the second chrominance component for a block for which a joint encoding mode is selected, the joint encoding mode being a mode in which a transform process and a quantization process are performed on a joint prediction residual generated from the prediction residual of the first chrominance component and the prediction residual of the second chrominance component.

The single component transformer/quantizer 122 performs the transform process and the quantization process on the prediction residual of each component outputted from the residual generator 110 in units of blocks. The single component transformer/quantizer 122 includes a single component transformer 122a and a single component quantizer 122b.

The single component transformer 122a performs the transform process on the prediction residual of each component outputted from the residual generator 110 to calculate transform coefficients for each frequency component and outputs the calculated transform coefficients to the single component quantizer 122b. The transform process is a process of transforming a pixel-domain signal into a frequency-domain signal and includes, for example, discrete cosine transform (DCT), discrete sine transform (DST), Karhunen Loeve transform (KLT), an integer transform based on any one of such transforms, or the like. Further, the transform process may include transform skip in which a pixel-domain signal is adjusted through scaling, or the like, without being transformed into a frequency-domain signal.

The single component quantizer 122b quantizes the transform coefficients of each component outputted from the single component transformer 122a using a quantization parameter (QP) and a quantization matrix (scaling list) and outputs the quantized transform coefficients of each component to the entropy encoder 130 and the inverse quantizer/inverse transformer 140. Here, the quantization parameter (QP) is a parameter that is applied in common to each transform coefficient in a block and is a parameter that determines quantization granularity. The quantization matrix is a matrix that has, as elements, quantization values used to control a quantization step for each transform coefficient when each transform coefficient is quantized.

FIG. 2 is a diagram illustrating an example of the quantization matrix. The quantization matrix is a matrix including values that are set for each component in one block. More specifically, the quantization matrix is a matrix including values (weighted coefficients) set for each component of i×j elements in accordance with a block size and is used to adjust quantization granularity for each component from a low frequency to a high frequency of the transform coefficients. FIG. 2 illustrates an example where i×j=4×4.

In the example illustrated in FIG. 2, values of the quantization matrix become greater as degrees in a horizontal direction and in a vertical direction increase. In such a quantization matrix, quantization is performed at lower accuracy for transform coefficients related to an element arranged in a lower right portion, that is, transform coefficients in a higher frequency. It is therefore allowed to reduce an information amount in a high frequency by quantization without deteriorating subjective image quality by utilizing visual characteristics of a human that a human is more sensitive to spatial change in density and color phase in a lower frequency.

Note that the quantization matrix can be set for each prediction mode of the encoding-target block (intra prediction or inter prediction), for each block size (for example, 2×2, 4×4, 8×8, 16×16, 32×32, 64×64) and for each combination of one type of illuminance and each of two chrominance signals.

The single component quantizer 122b may perform quantization using the quantization parameter (QP) different for each component and the quantization matrix in which elements different for each component are stored in the quantization process to be performed on the first chrominance component and the second chrominance component. Further, the quantization matrix may use default values defined by the system in advance or may use values determined on the encoding device 1 side. In a case where the quantization parameter (QP) and the quantization matrix determined on the encoding device 1 side are used, the single component quantizer 122b outputs the quantization parameter (QP) and the quantization matrix used in quantization to the entropy encoder 130 and the inverse quantizer/inverse transformer 140.

On the other hand, the joint transformer/quantizer 123 generates one joint prediction residual using correlation between the prediction residual of the first chrominance component and the prediction residual of the second chrominance component outputted from the residual generator 110 and outputs quantized joint transform coefficients generated through the transform process and the quantization process performed on the generated joint prediction residual to the entropy encoder 130. In this manner, encoding efficiency is improved by transmitting only one joint prediction residual for two chrominance components. The joint transformer/quantizer 123 includes a joint residual generator 123a, a joint transformer 123b and a joint quantizer 123c.

The joint residual generator 123a generates a joint prediction residual from the prediction residual of the first chrominance component and the prediction residual of the second chrominance component outputted from the residual generator 110 and outputs the generated joint prediction residual to the joint transformer 123b. More specifically, assuming that the first chrominance component of the prediction residual is resCb and the second chrominance component of the prediction residual is resCr, the joint residual generator 123a generates a joint prediction residual resJointC through the following expression (1).

$$\text{resJointC}[x][y]=(\text{resCb}[x][y]+\text{CSign}*\text{resCr}[x][y])/2 \quad (1)$$

x and y are positions of pixels in the encoding-target block, and CSign is a positive or negative sign (−1 or +1) that can be set in units of slices.

Further, when the joint residual generator 123a generates the joint prediction residual, a joint encoding mode optimal among a plurality of joint encoding modes may be able to be selected on the encoding device side. For example, the joint residual generator 123a may generate the joint prediction residual while switching a joint residual generation process among a plurality of joint residual generation processes in accordance with the joint encoding mode determined on the encoding device 1 side such that:

in a case where the joint encoding mode is "1", $$\text{resJointC}[x][y]=(4*\text{resCb}[x][y]+2*\text{CSign}*\text{resCr}[x][y])/5 \quad (2)$$

in a case where the joint encoding mode is "2", $$\text{resJointC}[x][y]=(\text{resCb}[x][y]+\text{CSign}*\text{resCr}[x][y])/2 \quad (3)$$

and in a case where the joint encoding mode is "3", $$\text{resJointC}[x][y]=(4*\text{resCr}[x][y]+2*\text{CSign}*\text{resCb}[x][y])/5 \quad (4)$$

The joint transformer 123b performs a transform process on the joint prediction residual outputted from the joint residual generator 123a to calculate the joint transform coefficients for each frequency component and outputs the calculated joint transform coefficients to the joint quantizer 123c.

The joint quantizer 123c quantizes the joint transform coefficients outputted from the joint transformer 123b using the quantization parameter (QP) and the quantization matrix and outputs quantized joint transform coefficients that are the quantized joint transform coefficients to the entropy encoder 130 and the inverse quantizer/inverse transformer 140.

In the present embodiment, the joint quantizer 123c can set the quantization parameter (QP) and the quantization matrix to be applied in the quantization process of the joint transform coefficients different from the quantization parameter (QP) and the quantization matrix to be applied to the transform coefficients of each of the first chrominance component and the second chrominance component by the single component quantizer 122b. Note that in the quantization process to be performed on the joint transform coefficients, the joint quantizer 123c may use a quantization matrix in which default values defined by the system in advance are stored or may use a quantization matrix in which elements set for quantization of the joint transform coefficients on the encoding device 1 side are stored.

The entropy encoder 130 performs entropy encoding on the quantized transform coefficients outputted from the transformer/quantizer 120, generates an encoded stream (bit stream) by performing data compression, and outputs the encoded stream to an outside of the encoding device 1. For the entropy encoding, Huffman coding, CABAC (Context-based Adaptive Binary Arithmetic Coding), or the like can be used.

More specifically, for a block for which the individual encoding mode is selected, the prediction residual of each component is subjected to a transform process and a quantization process by the single component transformer/quantizer 122, and the generated quantized transform coefficients for each component are inputted to the entropy encoder 130. The entropy encoder 130 performs entropy encoding on the inputted quantized transform coefficients of each component and outputs an encoded stream.

On the other hand, for a block for which the joint encoding mode is selected, the joint prediction residual generated by the joint transformer/quantizer 123 is subjected to a transform process and a quantization process by the joint transformer/quantizer 123, and the generated quantized joint transform coefficients are inputted to the entropy encoder 130. The entropy encoder 130 performs entropy encoding on the inputted quantized joint transform coefficients and outputs an encoded stream. In this event, the single component transformer/quantizer 122 neither performs processes related to the prediction residual of the first chrominance component and the prediction residual of the second chrominance component nor outputs the quantized transform coefficients to the entropy encoder 130.

Further, the entropy encoder 130 encodes information on a size, a shape, and the like, of each encoding-target block inputted from the block divider 100, a flag (first flag) indicating whether or not to apply the joint encoding mode inputted from the controller 180, and information (for example, information on the prediction mode and the motion vector) regarding prediction inputted from the predictor 170.

Further, in a case where the single component quantizer 122b and the joint quantizer 123c perform the quantization process using the quantization parameter (QP) and the quantization matrix set on the encoding device 1 side, the entropy encoder 130 encodes the applied quantization parameter (QP) and quantization matrix inputted from the single component quantizer 122b and the joint quantizer 123c.

The inverse quantizer/inverse transformer 140 performs an inverse quantization process and an inverse transform process on the quantized transform coefficients outputted from the transformer/quantizer 120 and outputs the restored prediction residual to the combiner 150. The inverse quantizer/inverse transformer 140 includes a single component inverse quantizer/inverse transformer 141 and a joint inverse quantizer/inverse transformer 142.

The single component inverse quantizer/inverse transformer 141 restores the prediction residual of each component by performing an inverse quantization process and an inverse transform process on the transform coefficients of each component outputted from the single component transformer/quantizer 122 and outputs the restored prediction residual to the combiner 150. The single component inverse quantizer/inverse transformer 141 includes a single component inverse quantizer 141a and a single component inverse transformer 141b.

The single component inverse quantizer 141a performs an inverse quantization process corresponding to the quantization process performed by the single component quantizer 122b. More specifically, the single component inverse quantizer 141a performs an inverse quantization process using the quantized transform coefficients of each component, the quantization parameter (QP) and the quantization matrix outputted from the single component quantizer 122b to restore the transform coefficients and outputs the restored transform coefficients to the single component inverse transformer 141b.

The single component inverse transformer 141b performs an inverse transform process corresponding to the transform process performed by the single component transformer 122a. For example, in a case where the single component transformer 122a performs DCT, the single component inverse transformer 141b performs inverse DCT. The single component inverse transformer 141b performs the inverse transform process on the transform coefficients of each component outputted from the single component inverse quantizer 141a to restore the prediction residual of each component and outputs a restoration prediction residual that is the restored prediction residual to the combiner 150.

On the other hand, the joint inverse quantizer/inverse transformer 142 restores the joint prediction residual by performing the inverse quantization process and the inverse transform process on the quantized joint transform coefficients outputted from the joint transformer/quantizer 123 for a block for which the joint encoding mode is selected, reconstructs the prediction residual of the first chrominance component and the prediction residual of the second chrominance component from the joint prediction residual and outputs these prediction residuals to the combiner 150. The joint inverse quantizer/inverse transformer 142 includes a joint inverse quantizer 142a, a joint inverse transformer 142b and a residual separator 142c.

The joint inverse quantizer 142a performs an inverse quantization process corresponding to the quantization process performed by the joint quantizer 123c. More specifically, the joint inverse quantizer 142a restores the joint transform coefficients by performing inverse quantization on the quantized joint transform coefficients outputted from the joint quantizer 123c using the quantization parameter (QP) and the quantization matrix and outputs the restored joint transform coefficients to the joint inverse transformer 142b.

The joint inverse transformer 142b performs an inverse transform process corresponding to the transform process performed by the joint transformer 123b. For example, in a case where the joint transformer 123b performs DCT, the joint inverse transformer 142b performs inverse DCT. The joint inverse transformer 142b performs the inverse transform process on the joint transform coefficients outputted from the joint inverse quantizer 142a to restore the joint prediction residual and outputs the restored joint prediction residual to the residual separator 142c.

The residual separator 142c restores the prediction residual of the first chrominance component and the prediction residual of the second chrominance component by separating the joint prediction residual outputted from the joint inverse transformer 142b and outputs the restored prediction residuals to the combiner 150.

More specifically, the residual separator 142c calculates the prediction residual resCb of the first chrominance component and the prediction residual resCr of the second chrominance component through the following expression (5) where the joint prediction residual is resJointC, and a positive or negative sign (−1 or +1) set in advance by the system in units of slices is CSign.

$$resCb[x][y]=resJointC[x][y]resCr[x][y] =CSign*resJointC[x][y] \quad (5)$$

x and y are positions of pixels in the encoding-target block.

Further, the residual separator 142c may perform a plurality separation processes in accordance with the joint encoding mode set at the joint residual generator 123a to separate the joint prediction residual.

For example, the residual separator 142c may calculate the prediction residual of the first chrominance component and the prediction residual of the second chrominance component while switching the separation process among the plurality of separation processes in accordance with the joint encoding mode determined on the encoding device 1 side such that, in a case where the joint encoding mode is "1", $$resCb[x][y]=resJointC[x][y]resCr[x][y]= (CSign*resJointC[x][y])>>1 \quad (6)$$

in a case where the joint encoding mode is "2", $$resCb[x][y]=resJointC[x][y]resCr[x][y] =CSign*resJointC[x][y] \quad (7)$$

and in a case where the joint encoding mode is "3", $$resCb[x][y]=(CSign*resJointC[x][y])>>1 \ resCr[x][y] =resJointC[x][y] \quad (8)$$

The combiner 150 combines the restoration prediction residual outputted from the inverse quantizer/inverse transformer 140 for each component with the prediction block outputted from the predictor 170 on a pixel-by-pixel basis. The combiner 150 reconstructs (decodes) an encoding-target block by adding individual pixel values of the restoration prediction residual to individual pixel values of the prediction block and outputs a decoded image (reconstructed block) on each of reconstructed blocks to the memory 160.

The memory 160 accumulates reconstructed blocks outputted from the combiner 150 as decoded images in units of frames. The memory 160 outputs the stored decoded images to the predictor 170.

The predictor 170 generates a prediction block corresponding to the encoding-target block for each component by performing a prediction process in units of the block and outputs the generated prediction block to the residual generator 110 and the combiner 150. The predictor 170 includes an inter predictor 171, an intra predictor 172 and a switcher 173.

The inter predictor 171 calculates a motion vector through a scheme such as block matching by using, for a reference image, a decoded image stored in the memory 160, generates an inter prediction block by predicting an encoding-target block, and outputs the generated inter prediction block to the switcher 173. The inter predictor 171 selects an optimal inter prediction method, from inter prediction using a plurality of reference images (typically, bi-prediction) and inter prediction using one reference image (uni-directional prediction), and performs inter prediction by using the selected inter prediction method. The inter predictor 171 outputs information related to inter prediction (the motion vector and the like) to the entropy encoder 130.

The intra predictor 172 selects an optimal intra prediction mode to be applied to an encoding-target block from among a plurality of intra prediction modes, and predicts the encoding-target block by using the selected intra prediction mode. The intra predictor 172 generates an intra prediction block by referencing decoded pixel values adjacent to the encoding-target block of a decoded image stored in the memory 160, and outputs the generated intra prediction block to the switcher 173. The intra predictor 172 outputs information related to the selected intra prediction mode to the entropy encoder 130.

The switcher 173 switches the prediction block between the inter prediction block outputted from the inter predictor 171 and the intra prediction block outputted from the intra predictor 172 and outputs one of the prediction blocks to the residual generator 110 and the combiner 150.

Figure 3:
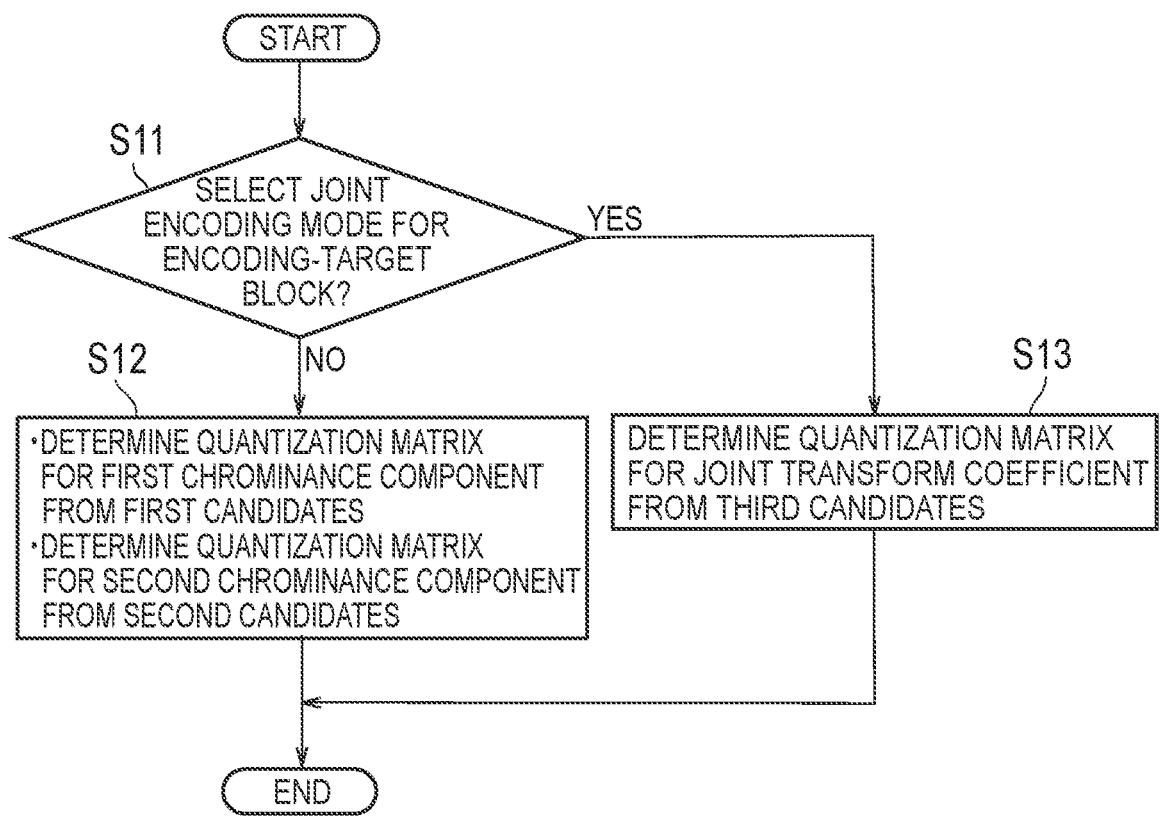
FIG. 3 is a diagram illustrating the operation of a controller of the encoding device according to the embodiment.

The controller 180 of the encoding device 1 according to the present embodiment will be described next. The controller 180 controls an encoding process of chrominance components. The controller 180 includes a mode selector 181 and a quantization controller 182. FIG. 3 is a diagram illustrating the operation of the controller 180 of the encoding device 1 according to the present embodiment.

As illustrated in FIG. 3, in step S11, the mode selector 181 selects one of the individual encoding mode in which the transform process and the quantization process are performed on the prediction residual of the first chrominance component and the prediction residual of the second chrominance component for each single component and the joint encoding mode in which the transform process and the quantization process are performed on the joint prediction residual generated from the prediction residual of the first chrominance component and the prediction residual of the second chrominance component. The mode selector 181 may perform the selection process in step S11 for each encoding-target block. The mode selector 181 outputs the flag (first flag) indicating whether or not the joint encoding mode is selected to the entropy encoder 130.

For example, the mode selector 181 calculates rate distortion cost from the prediction mode, the information amount necessary for transmitting the prediction residual and the image quality, for each of a case where the joint encoding mode is applied and a case where the joint encoding mode is not applied and determines whether or not to apply the joint encoding mode by comparing the calculated rate distortion cost.

The mode selector 181 controls the switcher 121 so as to output the prediction residual of the first chrominance component and the prediction residual of the second chrominance component to the single component transformer/quantizer 122 in a case where the individual encoding mode is selected (step S11: NO). On the other hand, the mode selector 181 controls the switcher 121 so as to output the prediction residual of the first chrominance component and the prediction residual of the second chrominance component to the joint transformer/quantizer 123 in a case where the joint encoding mode is selected (step S11: YES).

In a case where the mode selector 181 selects the individual encoding mode (step S11: NO), in step S12, the quantization controller 182 determines a quantization matrix to be applied to quantization of the transform coefficients of the first chrominance component from first candidates that are candidates for the quantization matrix corresponding to the first chrominance component and determines a quantization matrix to be applied to quantization of the transform coefficients of the second chrominance component from second candidates that are candidates for the quantization matrix corresponding to the second chrominance component.

Here, in a case of the individual encoding mode, a prediction mode in which energy of the prediction residual converges in a low frequency component by the transform process to be applied to the prediction residual of each of the first chrominance component and the second chrominance component is more likely to be selected. As a result of this, energy distribution of the transform coefficients of each of the first chrominance component and the second chrominance component tends to be more likely to be biased to the low frequency component. Thus, the first candidates and the second candidates are set as quantization matrixes in accordance with such energy distribution.

The quantization controller 182 outputs the quantization matrix to be applied to the transform coefficients of the first chrominance component and the quantization matrix to be applied to the transform coefficients of the second chrominance component to the single component quantizer 122b and the single component inverse quantizer 141a.

On the other hand, in a case where the mode selector 181 selects the joint encoding mode (step S11: YES), in step S13, the quantization controller 182 determines a quantization matrix to be applied to quantization of the joint transform coefficients from third candidates that are different from the first candidates and the second candidates.

Here, the third candidates are candidates for a quantization matrix prepared for the quantization process of the joint transform coefficients. The third candidates include at least one of a quantization matrix in which default values defined by the system in advance are stored and a quantization matrix in which elements set for quantization of the joint transform coefficients on the encoding device 1 side are stored.

The quantization controller 182 outputs the quantization matrix to be applied to quantization of the joint transform coefficients to the joint quantizer 123c and the joint inverse quantizer 142a.

In this manner, according to the present embodiment, a determination method of the quantization matrix is made different between the individual encoding mode and the joint encoding mode focusing on that energy distribution of the transform coefficients in a case where the joint encoding mode is applied is highly likely to be different from energy distribution of the transform coefficients in a case where the individual encoding mode is applied. More specifically, in a case where the joint encoding mode is applied, the controller 180 determines a quantization matrix to be used in the quantization process of the joint transform coefficients from candidates (third candidates) for the quantization matrix prepared for the joint encoding mode.

By this means, the encoding device 1 can perform the quantization process using the quantization matrix set for improving quality of a block to which the joint encoding mode is applied in a case where the joint encoding mode is applied. In other words, it is possible to use an appropriate quantization matrix in a case where the joint encoding mode is applied, so that it is possible to improve image quality and encoding efficiency.

<Decoding Device>

Figure 4:
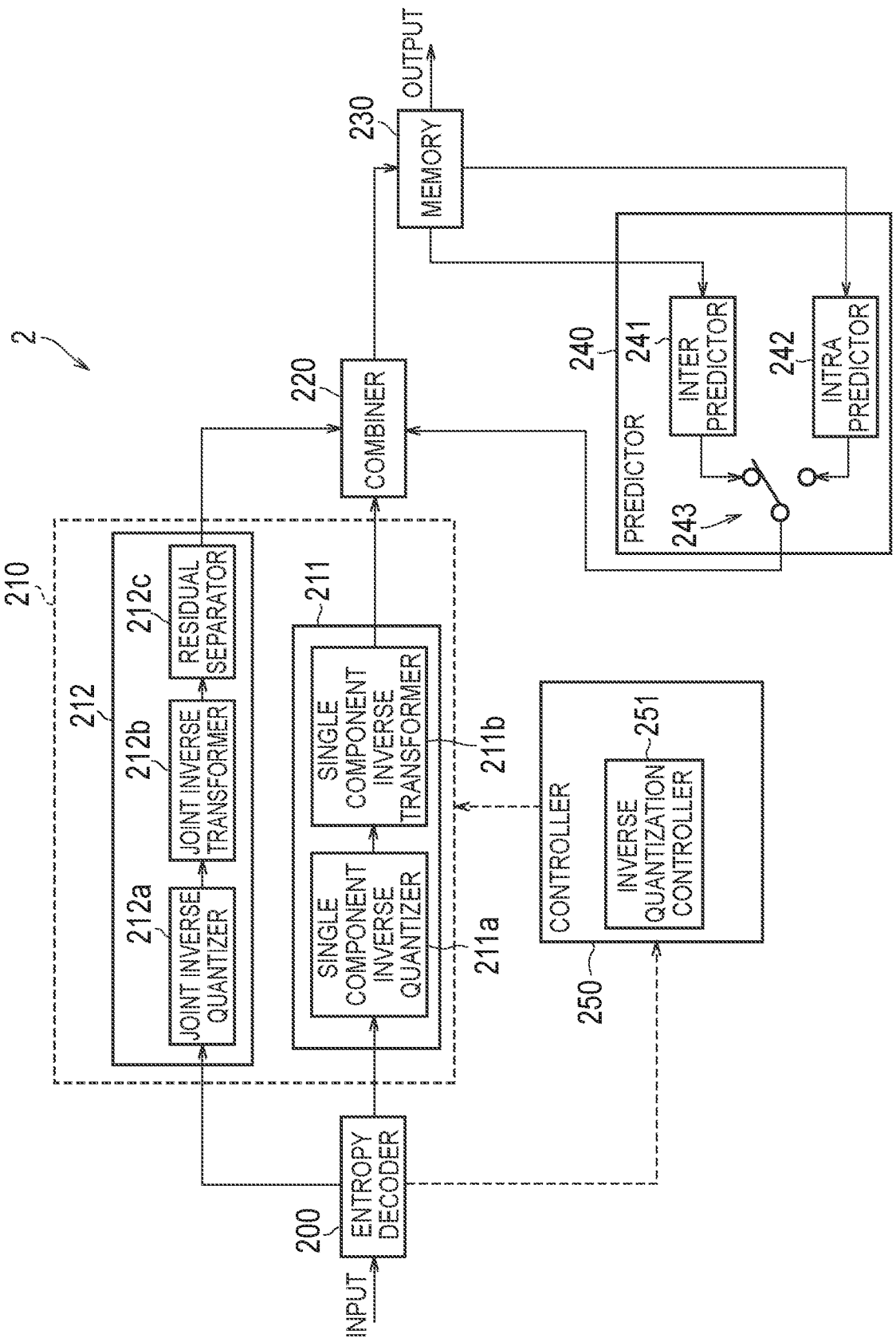
FIG. 4 s is a diagram illustrating the configuration of a decoding device according to the embodiment.

Next, the decoding device according to the present embodiment is described, focusing mainly on differences from the encoding device 1 described above. FIG. 4 is a diagram illustrating the configuration of the decoding device 2 according to the present embodiment. The decoding device 2 is a device that decodes a decoding-target block from an encoded stream.

As illustrated in FIG. 4, the decoding device 2 includes an entropy decoder 200, an inverse quantizer/inverse transformer 210, a combiner 220, a memory 230, a predictor 240 and a controller 250.

The entropy decoder 200 decodes the encoded stream generated by the encoding device 1 and decodes various kinds of signaling information. More specifically, the entropy decoder 200 acquires the flag (first flag) indicating whether or not the joint encoding mode is applied to a decoding-target block by decoding the encoded stream and outputs the acquired flag to the controller 250. Further, the entropy decoder 200 acquires information regarding the quantization process applied to the decoding-target block by decoding the encoded stream and outputs the acquired information to the inverse quantizer/inverse transformer 210. Further, the entropy decoder 200 acquires information regarding prediction applied to the decoding-target block (for example, prediction type information, motion vector information) by decoding the encoded stream and outputs the acquired information to the predictor 240.

Further, the entropy decoder 200 acquires the quantized transform coefficients by decoding the encoded stream and outputs the acquired quantized transform coefficients to the inverse quantizer/inverse transformer 210.

The inverse quantizer/inverse transformer 210 performs an inverse quantization process and an inverse transform process on the quantized transform coefficients outputted from the entropy decoder 200 and outputs the restored prediction residual to the combiner 220. The inverse quantizer/inverse transformer 210 includes a single component inverse quantizer/inverse transformer 211 and a joint inverse quantizer/inverse transformer 212.

The single component inverse quantizer/inverse transformer 211 restores the prediction residual of each component by performing an inverse quantization process and an inverse transform process on the transform coefficients of each component outputted from the entropy decoder 200 and outputs the restored prediction residual to the combiner 220. The single component inverse quantizer/inverse transformer 211 includes a single component inverse quantizer 211a and a single component inverse transformer 211b.

The single component inverse quantizer 211a performs an inverse quantization process corresponding to the quantization process performed by the single component quantizer 122b of the encoding device 1. More specifically, the single component inverse quantizer 211a restores the transform coefficients by performing the inverse quantization process using the quantization parameter (QP) and the quantization matrix and outputs the restored transform coefficients to the single component inverse transformer 211b.

The single component inverse transformer 211b performs an inverse transform process corresponding to the transform process performed by the single component transformer 122a of the encoding device 1. For example, in a case where the single component transformer 122a performs DCT, the single component inverse transformer 211b performs inverse DCT. The single component inverse transformer 211b performs the inverse transform process on the transform coefficients of each component outputted from the single component inverse quantizer 211a to restore the prediction residual of each component and outputs a restoration prediction residual that is the restored prediction residual to the combiner 220.

Note that for a block for which the joint encoding mode is selected, the single component inverse quantizer/inverse transformer 211 neither performs processes on the first chrominance component and the second chrominance component nor performs the output to the combiner 220.

On the other hand, for a block for which the joint encoding mode is selected, the joint inverse quantizer/inverse transformer 212 restores the joint prediction residual by performing the inverse quantization process and the inverse transform process on the quantized joint transform coefficients outputted from the entropy decoder 200, reconstructs the prediction residual of the first chrominance component and the prediction residual of the second chrominance component from the joint prediction residual and outputs these prediction residuals to the combiner 220. The joint inverse quantizer/inverse transformer 212 includes a joint inverse quantizer 212a, a joint inverse transformer 212b and a residual separator 212c.

The joint inverse quantizer 212a performs an inverse quantization process corresponding to the quantization process performed by the joint quantizer 123c of the encoding device 1. More specifically, the joint inverse quantizer 212a restores the joint transform coefficients by performing inverse quantization on the quantized joint transform coefficients outputted from the entropy decoder 200 using the quantization parameter (QP) and the quantization matrix and outputs the restored joint transform coefficients to the joint inverse transformer 212b.

In the present embodiment, the joint inverse quantizer 212a can set the quantization parameter (QP) and the quantization matrix to be applied in the inverse quantization process of the quantized joint transform coefficients different from the quantization parameter (QP) and the quantization matrix to be applied to the quantized transform coefficients of each of the first chrominance component and the second chrominance component by the single component inverse quantizer 211a. Note that the joint inverse quantizer 212a may use a quantization matrix in which default values defined by the system in advance are stored or may use a quantization matrix in which elements set on the encoding device 1 side are stored in the inverse quantization process to be performed on the quantized joint transform coefficients.

The joint inverse transformer 212b performs an inverse transform process corresponding to the transform process performed by the joint transformer 123b of the encoding device 1. For example, in a case where the joint transformer 123b performs DCT, the joint inverse transformer 212b performs inverse DCT. The joint inverse transformer 212b performs the inverse transform process on the joint transform coefficients outputted from the joint inverse quantizer 212a to restore the joint prediction residual and outputs the restored joint prediction residual to the residual separator 212c.

Note that for a block for which the individual encoding mode is selected, the joint inverse quantizer/inverse transformer 212 does not perform any process.

The residual separator 212c restores the prediction residual of the first chrominance component and the prediction residual of the second chrominance component by separating the joint prediction residual outputted from the joint inverse transformer 212b and outputs the restored prediction residual to the combiner 220.

More specifically, the residual separator 212c calculates the prediction residual resCb of the first chrominance component and the prediction residual resCr of the second chrominance component through the above expression (5). The residual separator 212c may perform one of the separation processes in the above expression (6) to expression (8) in accordance with the joint encoding mode selected by the encoding device 1.

The combiner 220 combines the restored prediction residual outputted from the inverse quantizer/inverse transformer 210 for each component with the prediction block outputted from the predictor 240 on a pixel-by-pixel basis. The combiner 220 reconstructs (decodes) a decoding-target block by adding individual pixel values of the restoration prediction residual to individual pixel values of the prediction block and outputs a decoded image (reconstructed block) on each of reconstructed blocks to the memory 230.

The memory 230 accumulates reconstructed blocks outputted from the combiner 220 as decoded images in units of frames. The memory 230 outputs the stored decoded images to the predictor 240.

The predictor 240 generates a prediction block corresponding to the decoding-target block for each component by performing a prediction process in units of the block and outputs the generated prediction block to the residual generator 110 and the combiner 220. The predictor 240 includes an inter predictor 241, an intra predictor 242 and a switcher 243.

The inter predictor 241 predicts the decoding-target block by using, for a reference image, a decoded image stored in the memory 230, based on the information outputted from the entropy decoder 200 to generate an inter prediction block and outputs the generated inter prediction block to the switcher 243.

The intra predictor 242 predicts the decoding-target block by using an intra prediction mode selected from a plurality of intra prediction modes based on the information outputted from the entropy decoder 200 to generate an intra prediction block and outputs the generated intra prediction block to the switcher 243.

The switcher 243 switches the prediction block between the inter prediction block outputted from the inter predictor 241 and the intra prediction block outputted from the intra predictor 242 and outputs one of the prediction blocks to the residual generator 110 and the combiner 220.

Figure 5:
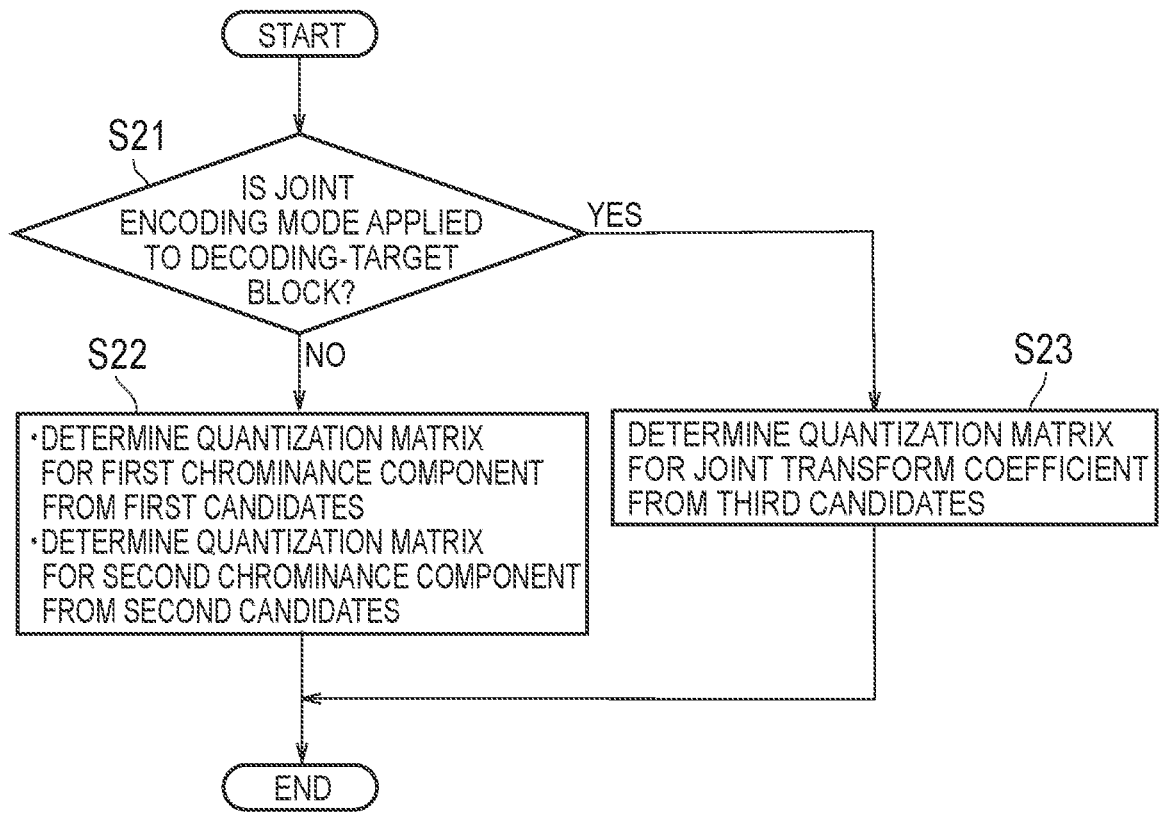
FIG. 5 is a diagram illustrating the operation of a controller of the decoding device according to the embodiment.

The controller 250 of the decoding device 2 according to the present embodiment will be described next. The controller 250 controls a decoding process of chrominance components. The controller 250 includes an inverse quantization controller 251. FIG. 5 is a diagram illustrating the operation of the controller 250 of the decoding device 2 according to the present embodiment.

As illustrated in FIG. 5, in step S21, the inverse quantization controller 251 specifies one of the individual encoding mode and the joint encoding mode based on the flag (first flag) outputted from the entropy decoder 200. The inverse quantization controller 251 may perform a process in step S21 for each decoding-target block.

In a case where the flag indicates the individual encoding mode (step S21: NO), in step S22, the inverse quantization controller 251 determines a quantization matrix to be applied to inverse quantization of the quantized transform coefficients of the first chrominance component from first candidates that are candidates for the quantization matrix corresponding to the first chrominance component and determines a quantization matrix to be applied to inverse quantization of the quantized transform coefficients of the second chrominance component from second candidates that are candidates for the quantization matrix corresponding to the second chrominance component.

Here, in a case of the individual encoding mode, a prediction mode in which energy of the prediction residual converges in a low frequency component by a transform process to be applied to the prediction residual of each of the first chrominance component and the second chrominance component is more likely to be selected. As a result of this, energy distribution of the transform coefficients of each of the first chrominance component and the second chrominance component tends to be more likely to be biased to the low frequency component. Thus, the first candidates and the second candidates are set as quantization matrixes in accordance with such energy distribution.

The inverse quantization controller 251 outputs the quantization matrix to be applied to inverse quantization of the quantized transform coefficients of the first chrominance component and the quantization matrix to be applied to inverse quantization of the quantized transform coefficients of the second chrominance component to the single component inverse quantizer 211a.

On the other hand, in a case where the flag indicates the joint encoding mode (step S21: YES), in step S23, the inverse quantization controller 251 determines a quantization matrix to be applied to inverse quantization of the quantized joint transform coefficients from third candidates different from the first candidates and the second candidates.

Here, the third candidates are candidates for a quantization matrix prepared for an inverse quantization process of the quantized joint transform coefficients. The third candidates include at least one of a quantization matrix in which default values defined by the system in advance are stored and a quantization matrix in which elements set for inverse quantization of the quantized joint transform coefficients by the encoding device 1 side are stored.

The inverse quantization controller 251 outputs the quantization matrix to be applied to inverse quantization of the quantized joint transform coefficients to the joint inverse quantizer 212a.

In this manner, according to the present embodiment, a determination method of the quantization matrix is made different between the individual encoding mode and the joint encoding mode focusing on that energy distribution of the transform coefficients in a case where the joint encoding mode is applied is highly likely to be different from energy distribution of the transform coefficients in a case where the individual encoding mode is applied. More specifically, for a block to which the joint encoding mode is applied, the controller 250 determines a quantization matrix to be used in the quantization process of the joint transform coefficients from candidates (third candidates) for a quantization matrix prepared for the joint encoding mode.

By this means, the decoding device 2 can perform the inverse quantization process using the quantization matrix set for improving quality of a block to which the joint encoding mode is applied in a case where the joint encoding mode is applied. In other words, it is possible to use an appropriate quantization matrix in a case where the joint encoding mode is applied, so that it is possible to improve image quality and encoding efficiency.

<Modifications>

Modifications of the embodiment will be described next, focusing mainly on differences from the above-described embodiment.

In the above-described embodiment, the quantization controller 182 of the encoding device 1 and the inverse quantization controller 251 of the decoding device 2 determine a quantization matrix to be used in the quantization process based on whether or not the joint encoding mode is applied.

On the other hand, the quantization controller 182 of the encoding device 1 and the inverse quantization controller 251 of the decoding device 2 according to the present modification determine a quantization matrix to be used in the quantization process based on whether or not the joint encoding mode is applied and a flag (second flag) indicating a quantization matrix to be used in a case where the joint encoding mode is applied.

More specifically, the quantization controller 182 of the encoding device 1 determines one of a quantization matrix (hereinafter, referred to as a "first chrominance quantization matrix") to be applied to the transform coefficients of the first chrominance component by the single component quantizer 122b and a quantization matrix (hereinafter, referred to as a "second chrominance quantization matrix") to be applied to the transform coefficients of the second chrominance component by the single component quantizer 122b as a quantization matrix (hereinafter, referred to as a "chrominance joint quantization matrix") to be used in the quantization process for the joint transform coefficients outputted from the joint transformer 123b.

In a case where the quantization controller 182 determines the first chrominance quantization matrix as the chrominance joint quantization matrix, the joint quantizer 123c of the encoding device 1 performs the quantization process on the joint transform coefficients outputted from the joint transformer 123b using the quantization parameter (QP) set for the encoding-target block and the first chrominance quantization matrix.

On the other hand, in a case where the quantization controller 182 determines the second chrominance quantization matrix as the chrominance joint quantization matrix, the joint quantizer 123c of the encoding device 1 performs the quantization process on the joint transform coefficients outputted from the joint transformer 123b using the quantization parameter (QP) set for the encoding-target block and the second chrominance quantization matrix.

The entropy encoder 130 of the encoding device 1 outputs a bit stream including the first flag indicating whether or not to apply the joint encoding mode and the second flag indicating a quantization matrix (chrominance joint quantization matrix) to be used in a case where the joint encoding mode is applied. The second flag is a flag (one-bit information) indicating whether to use the first chrominance quantization matrix or the second chrominance quantization matrix as the chrominance joint quantization matrix.

The entropy encoder 130 signals (that is, transmits to the decoding side) the second flag in units of sequences, in units of pictures or in units of slices. For example, the entropy encoder 130 may signal the second flag in a sequence parameter set (SPS) that is a set of encoding information for a sequence and may perform the same control on the quantization matrix in all pictures/slices included in a sequence that refers to the SPS.

Alternatively, the entropy encoder 130 may signal the second flag in a picture parameter set (PPS) that is a set of encoding information for a picture and may control selection of the quantization matrix for each picture that refers to the PPS.

Alternatively, the entropy encoder 130 may signal the second flag in a picture header (PH) including encoding information for each encoding-target picture or in a slice header (SH) including encoding information for each slice and may switch selection control of the quantization matrix for each picture/slice.

Alternatively, the entropy encoder 130 may signal the second flag in an adaptation parameter set (APS) including information on a scaling list.

At the decoding device 2 according to the present modification, the entropy decoder 200 decodes the encoded stream generated by the encoding device 1 and outputs the first flag indicating whether or not the joint encoding mode is applied to the decoding-target block, and the second flag indicating whether a chrominance joint quantization matrix to be used by the joint inverse quantizer 212a is the first chrominance quantization matrix or the second chrominance quantization matrix. The second flag is a flag indicating a chrominance joint quantization matrix to be used in a case where the joint encoding mode is applied in units of sequences, in units of pictures or in units of slices.

The inverse quantization controller 251 of the decoding device 2 determines a chrominance joint quantization matrix to be used by the joint inverse quantizer 212a based on the first flag and the second flag. More specifically, in a case where the first flag indicates that the joint encoding mode is applied to the decoding-target block, the inverse quantization controller 251 determines the first chrominance quantization matrix or the second chrominance quantization matrix indicated by the second flag as the chrominance joint quantization matrix.

The joint inverse quantizer 212a performs an inverse quantization process corresponding to the quantization process performed by the joint quantizer 123c of the encoding device 1. More specifically, the joint inverse quantizer 212a restores the joint transform coefficients by inversely quantizing the quantized joint transform coefficients outputted from the entropy decoder 200 using the quantization parameter (QP) and the chrominance joint quantization matrix determined by the inverse quantization controller 251 and outputs the restored joint transform coefficients to the joint inverse transformer 212b.

In this manner, according to the present modification, a chrominance joint quantization matrix to be used in the quantization process is determined in accordance with the first flag indicating whether or not the joint encoding mode is applied and the second flag set for each sequence, each picture, each slice, or the like, so that it is possible to achieve a flexible quantization process without transmitting a new quantization matrix for the joint encoding mode from the encoding side to the decoding side.

An example has been described in the present modification where the second flag is a flag indicating one of the first chrominance quantization matrix and the second quantization matrix.

However, the second flag may be a flag indicating one of the first chrominance quantization matrix, the second chrominance quantization matrix and an illuminance quantization matrix. The illuminance quantization matrix refers to a quantization matrix to be applied to transform coefficients of the illuminance component by the single component quantizer 122b. In this case, the second flag may be two-bit information.

The second flag may be a flag indicating one of the first chrominance quantization matrix, the second chrominance quantization matrix, the illuminance quantization matrix and other quantization matrixes (that is, a new quantization matrix for the joint encoding mode). The entropy encoder 130 may signal the new quantization matrix to the decoding side only in a case where the second flag indicates the new quantization matrix for the joint encoding mode. In a case where the second flag indicates the new quantization matrix for the joint encoding mode, the entropy decoder 200 acquires the new quantization matrix signaled from the encoding side.

<Other Embodiments>

An example has been described in the above-described embodiment where the first component is the first chrominance component Cb and the second component is the second chrominance component Cr. However, the present invention can be applied in a case where an image composed of two or more components is encoded/decoded. For example, the operation according to the above-described embodiment may be applied to an image composed of an R component, a G component and a B component.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. An encoding device that performs encoding on each of blocks generated by dividing an image composed of two or more components including a first component and a second component, the encoding device comprising:
    a predictor configured to generate, for each component, a prediction block corresponding to an encoding-target block based on a prediction mode;
    a residual generator configured to generate, for each component, a prediction residual representing a difference between the encoding-target block and the prediction block;
    a mode selector configured to select, for a prediction residual of the first component and a prediction residual of the second component, one encoding mode either an individual residual encoding mode performing a transform process and a quantization process on the first component and the second component for each single component, or a joint residual encoding mode performing a transform process and a quantization process on a joint prediction residual generated from the prediction residual of the first component and the prediction residual of the second component;
    a quantization controller configured to determine a scaling list to be used in the quantization process based on the residual encoding mode selected by the mode selector; and
    a joint transformer/quantizer configured to perform the quantization process on joint transform coefficients generated through the transform process of the joint prediction residual, using the scaling list determined by the quantization controller, in a case where the mode selector selects the joint residual encoding mode.

2. The encoding device according to claim 1, wherein the quantization controller is configured to determine the scaling list to be used in the quantization process based on whether or not the mode selector selects the joint residual encoding mode.

3. The encoding device according to claim 2, wherein
    in a case where the mode selector selects the individual residual encoding mode, the quantization controller is configured to
        determine a scaling list to be applied to quantization of transform coefficients of the first component from first candidates that are candidates for a scaling list corresponding to the first component, and
        determine a scaling list to be applied to quantization of transform coefficients of the second component from second candidates that are candidates for a scaling list corresponding to the second component, and
    the quantization controller is configured to determine a scaling list to be applied to quantization of the joint transform coefficients from third candidates different from the first candidates and the second candidates, in a case where the mode selector selects the joint residual encoding mode.

4. The encoding device according to claim 3, wherein the third candidates include at least one of a scaling list in which default values defined by a system in advance are stored and a scaling list in which elements set for quantization of the joint transform coefficients on the encoding device side are stored.

5. The encoding device according to claim 1, further comprising
    an entropy encoder configured to signal to a decoding side, a flag indicating a scaling list to be used in a case where the joint residual encoding mode is applied in units of sequences, in units of pictures or in units of slices.

6. The encoding device according to claim 5, wherein the flag is configured to indicate one of a scaling list to be applied to the first component and a scaling list to be applied to the second component as the scaling list to be used in a case where the joint residual encoding mode is applied.

7. The encoding device according to claim 1, wherein the first component is a first chrominance component, and the second component is a second chrominance component.

8. A decoding device that performs decoding on each of blocks generated by dividing an image composed of two or more components including a first component and a second component, the decoding device comprising:
    an entropy decoder configured to output a prediction mode and a first flag and quantized transform coefficients by decoding an encoded stream, the first flag indicating whether or not a joint residual encoding mode is applied on an encoding device side, wherein the joint residual encoding mode performs a transform process and a quantization process on a joint prediction residual generated from a prediction residual of the first component and a prediction residual of the second component at the encoder side;
    an inverse quantization controller configured to determine a scaling list to be used in an inverse quantization process to be performed on the quantized transform coefficients based on the first flag; and
    a joint inverse quantizer configured to perform the inverse quantization process on the quantized transform coefficients outputted from the entropy decoder, using the scaling list determined by the inverse quantization controller, in a case where the first flag indicates that the joint residual encoding mode is applied.

9. The decoding device according to claim 8, wherein
    in a case where the first flag indicates that an individual residual encoding mode is applied, the individual residual encoding mode performing, for each single component, a transform process and a quantization process on the prediction residual of the first component and the prediction residual of the second component, the inverse quantization controller is configured to
        determine a scaling list to be applied to inverse quantization of quantized transform coefficients of the first component from first candidates that are candidates for a scaling list corresponding to the first component, and
        determine a scaling list to be applied to inverse quantization of quantized transform coefficients of the second component from second candidates that are candidates for a scaling list corresponding to the second component, and the inverse quantization controller is configured to determine a scaling list to be applied to inverse quantization of quantized joint transform coefficients from third candidates different from the first candidates and the second candidates, in a case where the first flag indicates that the joint residual encoding mode is applied.

10. The decoding device according to claim 9, wherein the third candidates include at least one of a scaling list in which default values defined by a system in advance are stored and a scaling list in which elements set for quantization of the joint transform coefficients on the encoding device side are stored.

11. The decoding device according to claim 8, wherein
the entropy decoder is configured to further output a second flag indicating a scaling list to be used in a case where the joint residual encoding mode is applied in units of sequences, in units of pictures or in units of slices by decoding the encoded stream, and
the inverse quantization controller is configured to determine the scaling list to be used in the inverse quantization process based on the first flag and the second flag.

12. The decoding device according to claim 11, wherein the second flag indicates one of a scaling list to be applied to the first component and a scaling list to be applied to the second component as a scaling list to be used in a case where the joint residual encoding mode is applied.

13. The decoding device according to claim 8, wherein the first component is a first chrominance component, and the second component is a second chrominance component.

14. A non-transitory computer-readable medium storing a program causing a computer to function as the encoding device according to claim 1.

15. A non-transitory computer-readable medium storing a program causing a computer to function as the decoding device according to claim 8.

* * * * *